United States Patent [19]

Traut

[11] Patent Number: 5,140,767
[45] Date of Patent: Aug. 25, 1992

[54] ICE NET

[76] Inventor: Donald P. Traut, 6962 Dover Cir., Arvada, Colo. 80004

[21] Appl. No.: 669,100

[22] Filed: Mar. 13, 1991

[51] Int. Cl.⁵ .................................... A01K 97/01
[52] U.S. Cl. ..................................... 43/4; 294/53.5; 210/470
[58] Field of Search ............. 43/4, 11, 12, 4.5, 5, 43/8, 134, 7; 294/55, 53.5, 19.1, 19.2; 210/470

[56] References Cited

U.S. PATENT DOCUMENTS

| | | | |
|---|---|---|---|
| 1,420,919 | 6/1922 | Fike | 294/53.5 |
| 2,312,736 | 3/1943 | Schmal | 294/53.5 |
| 3,289,850 | 12/1966 | Gubash | 210/470 |
| 3,645,578 | 2/1972 | Renfroe | 294/53.5 |
| 3,722,940 | 3/1973 | Misjak | 43/4 |
| 3,747,253 | 7/1973 | Gangi et al. | 43/4 |
| 3,857,787 | 12/1974 | Kinne | 294/53.5 |
| 4,240,656 | 12/1980 | Effinger | 294/1 BA |
| 4,718,188 | 1/1988 | Roberts | 43/4 |
| 4,769,939 | 9/1988 | Gonska et al. | 43/4 |
| 4,866,872 | 9/1989 | Guilbault et al. | 43/4 |

*Primary Examiner*—Richard K. Seidel
*Assistant Examiner*—Jeanne M. Elpel
*Attorney, Agent, or Firm*—H. Kenneth Johnston, II

[57] ABSTRACT

An accessory for ice fishing for preventing the loss of a fish by breaking the line or dislodging the hook while being pulled through the ice hole; the device consists of a handle with a downward extension handle and an ice scoop separated by a downward extension tube whereby the ice scoop is hinged so that the scoop may be brought to the closed position when a fish has been pulled into the ice hole precluding the fish from getting away even if the line is broken or the fish had dislodged the hook.

1 Claim, 2 Drawing Sheets

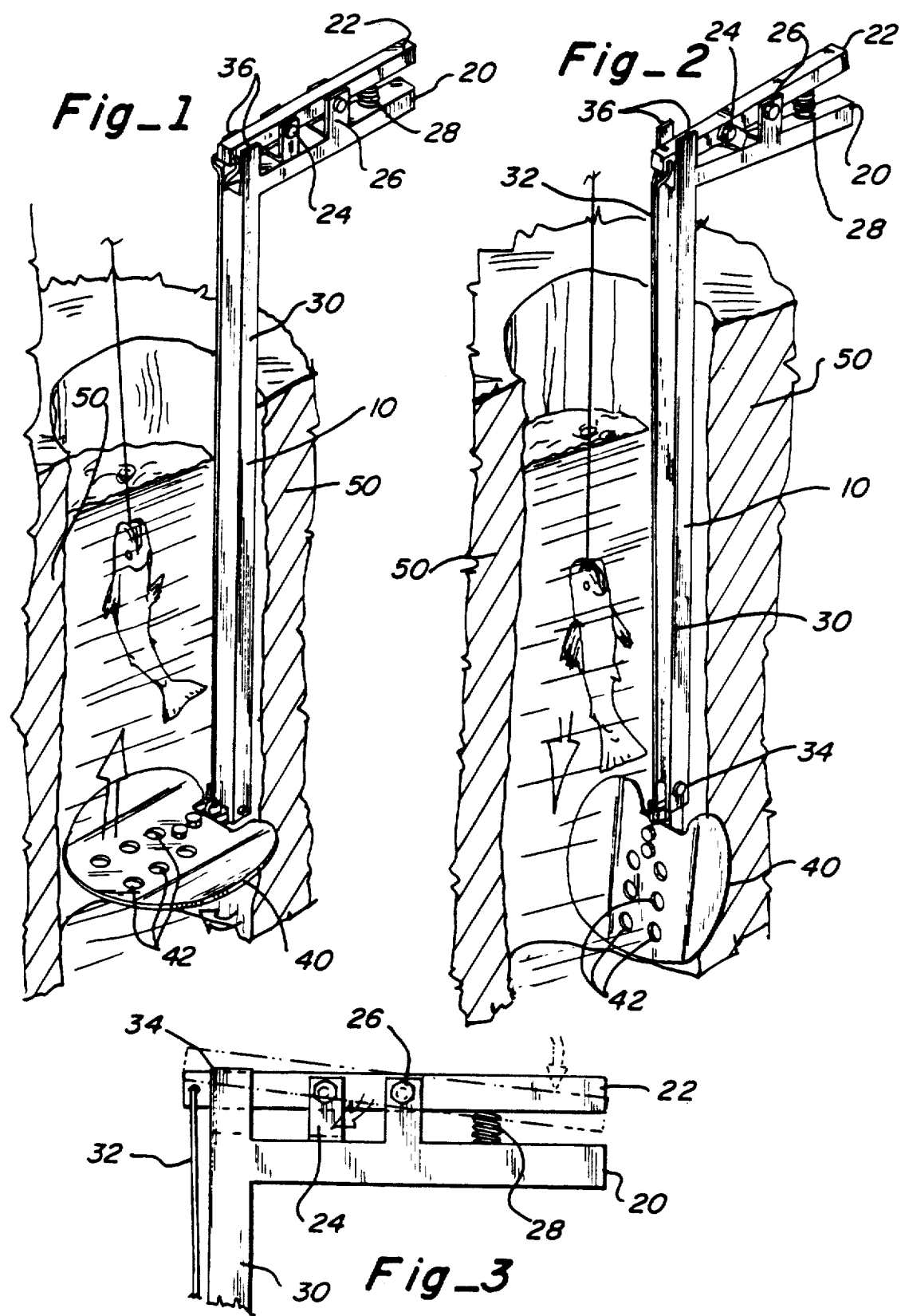

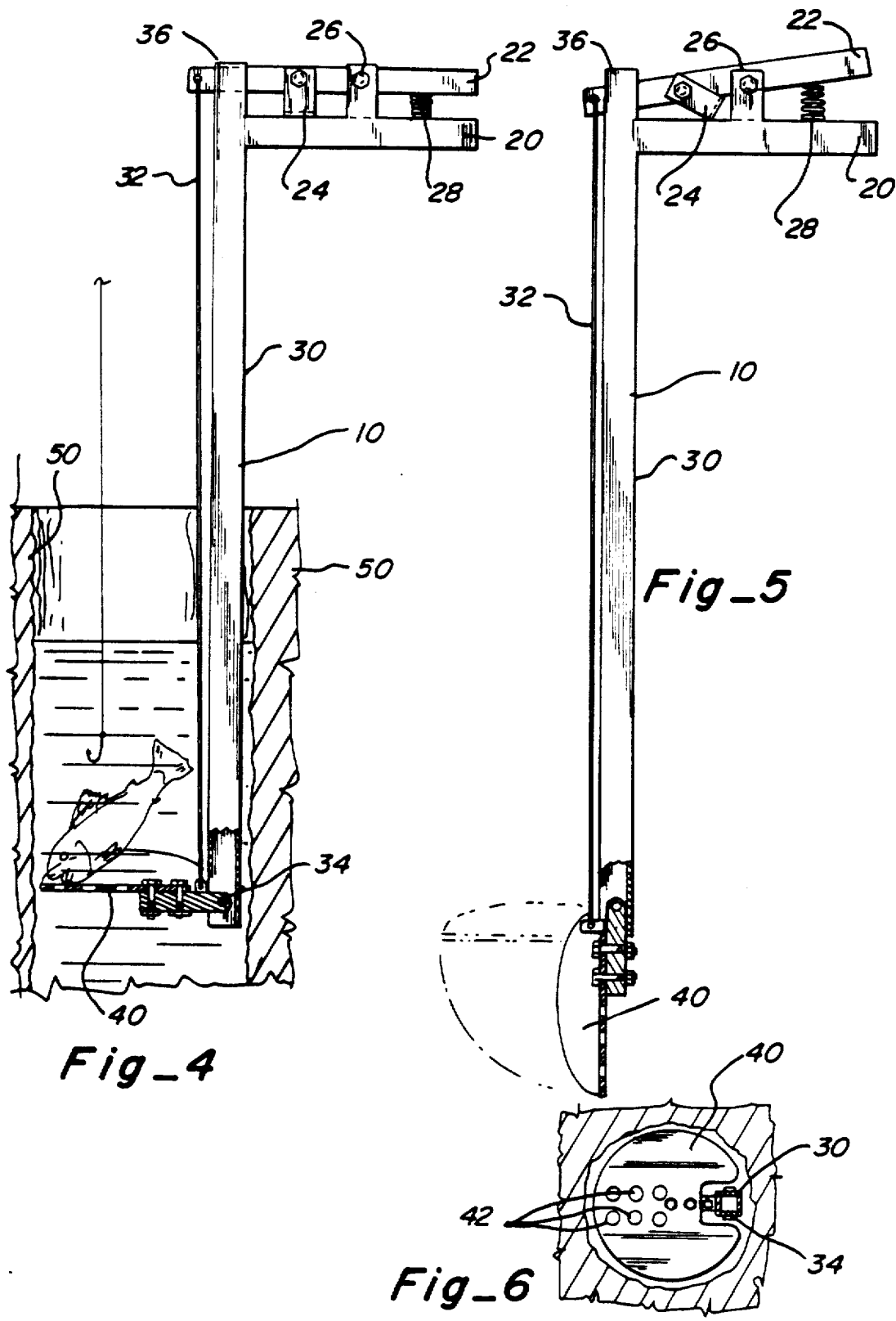

ICE NET

BACKGROUND OF THE INVENTION

It is generally well known to the ice fisherman that fish are lost while trying to land them through the ice hole. A problem can arise where the weight of fish exceeds the tensile strength of the fishing line or where additional stress is created by the violent movement of the fish as it is being withdrawn through the ice hole. In either case there is a tendency for a fishing line to break under such stress which allows the fish to escape. Additionally there is the possibility for a fish to dislodge the hook during the attempt to land the fish and again the fish is lost. Ice holes are generally relatively small and render it impossible to use the traditional net to assist in the retrieval of the fish through the ice hole as the net will not fit into the hole. Sometimes in the excitement the fisherman tries to prevent the loss of the fish by reaching down into the icy water to block its escape generally without success. In doing so, the fisherman exposes himself to the perils of being wet in freezing temperatures as well as just being uncomfortable.

There have been many devices to attempt to preclude the problem of losing the fish as well as avoid getting wet.

Some of the devices such as disclosed in U.S. Pat. No. 4,783,926, McKinney, cause substantial damage to the meat of any fish when gaffed. Gangi, U.S. Pat. No. 3,747,253, a combination gaff and ice scoop is difficult to utilize with out causing damage to the meat due to the narrow working area in the ice hole. Gonska et. al., U.S. Pat. No. 4,769,939 discloses a combination tool with an ice skimmer at one end and a gaff at the other. This device has the same limitations as the previously discussed devices.

Misjak, U.S. Pat. No. 3,722,940 and Guilbault et al., U.S. Pat. No. 4,866,872 both disclose devices which attach to the ice hole and can be swivelled into place and raised after a fish is caught and pulled into the ice hole. Although these devices may essentially preclude a fish from getting away they are cumbersome or damage the fish and are limited to their use in the one hole once attached. They also allow the fish line to get tangled and allow the fish to break the line or dislodge the hook and escape.

Another consideration is that because of many state requirements, that the fish must be of certain size, it is difficult to tell how large the fish is until it has been removed from the water and therefore care must be used not to injure the fish if it must be released.

SUMMARY OF THE INVENTION

It is an object of the present invention to provide a new and useful apparatus to assist in the retrieval of fish caught through an ice hole.

It is another object of this present invention to provide an apparatus that minimizes injury to a fish while being raised to the surface through an ice hole.

It is still further another object of the present invention to provide an apparatus which may be used to retrieve a fish through an ice hole.

According to the present invention, an apparatus is provided for use by an ice fisherman to retrieve a fish caught on a fishing line wherein the fisherman fishes through an ice hole cut through an ice layer on a body of water that defines the fish habitat. The apparatus broadly includes a handle affixed to an extension tube having a hinged scoop. The handle has a lever pivotally affixed so that when it is squeezed, the lever raises the scoop by a pull rod which is attached to the lever at one end and the rearward portion of the scoop. The length of the extension tube is sufficient to be able to reach down into the ice hole after the fish has been brought up into the hole and then the lever is squeezed raising the scoop entrapping the fish within the ice hole prohibiting its escape if the line breaks or the hook is dislodged.

The within invention may also be used to remove the ice chips generated when drilling the ice hole.

BRIEF DESCRIPTION OF THE DRAWINGS

FIG. 1 is a side perspective view of the ice fish net in the closed position.

FIG. 2 is a side perspective view of the ice fish net in the open position.

FIG. 3 is a side view of the handle and lever being activated.

FIG. 4 is a side perspective of the ice fish net in use preventing the loss of a fish.

FIG. 5 is a side perspective showing the activation of the scoop.

FIG. 6 is a bottom perspective of the ice fish net within the ice hole. Taken along the line 6—6 of FIG. 1.

DESCRIPTION OF THE PREFERRED EMBODIMENT

In use the ice fish net 10 is inserted into an ice hole which is normally made by an ice auger having a 7", 8", 10" or more diameter bore and drilling through ice layer 50. After a caught fish is brought into the ice hole, ice fish net 10 is inserted in the ice hole in the open position using handle 20 and sliding the scoop 40 past the caught fish as shown in FIG. 2. Scoop 40 is contoured to be able to be activated within the ice hole and is not generally placed below the lower portion of the ice layer 50. With the caught fish within the ice hole, lever 22 is squeezed raising scoop 40 to a horizontal position. Lever 22 is pivotally affixed to handle 20 at pivot 26 so that when lever 22 and handle 20 are squeezed together, the rearward portion of lever 22 moves downward in close proximity of handle 20 and the forward portion of lever 22 moves upwardly. Pull rod 32 is affixed, by normal means at one end, to the forward end of lever 22 and the other end of pull rod 32 is affixed to scoop 40 and pull rod 32 when raised by the forward end of lever 22 raises scoop 40 to the horizontal position. Extension tube 30 is affixed to handle 20 at one end and scoop 40 by means of hinge 34 at the other end of extension tube 30, as shown in FIG. 1 and FIG. 4. Scoop 40 is designed so that when in the horizontal position, a loose fish could not escape.

Scoop 40 is maintained in the vertical position by the upward pressure exerted by tension device 28 until the ice fish net 10 is ready to be used as shown in FIG. 2 and FIG. 5. When scoop 40 is moved to the horizontal position, pull rod 32 moves upwardly with the forward portion of lever 22. As the forward end of lever 22 moves upward, lock 24 automatically swings into place precluding downward movement of the forward portion of lever 22 and securing scoop 40 in the horizontal position as shown in FIGS. 1, 3, and 4.

Scoop 40 has perforations 42 to allow the water to readily flow through scoop 40 for ease of raising the fish to the surface, as shown in FIG. 1.

Lever 22 and handle 20 are squeezed together at the rearward portion of lever 22 and lock 24 is moved rearwardly allowing the forward portion of lever 22 to move downwardly between guides 36 and returning scoop 40 to its open or vertical position.

In the drawings and specification there has been set forth the best mode, presently contemplated, for the practice of the present invention, and although specific terms are employed, they are used in a generic and descriptive sense only and are not for purposes of limitation, for example: The lock could be placed at the rearward most part of lever 22 and engage handle 20 to preclude movement of scoop 40 when it is in the up or horizontal position. As suggested, several modifications of the specific design features illustrated herein are permissible while still retaining the essential features of the tool of this invention without departing from the scope of the applicants invention.

What is claimed:

1. An accessory for ice fishing for preventing the loss of a fish by breaking the line or the fish dislodging the hook while being raised through an ice hole comprising:

a handle;

said handle affixed perpendicularly at a forward end to an upper end of an extension tube;

a scoop hingedly affixed to a lower end of said extension tube;

said scoop capable of transitioning from a vertical position to a horizontal position;

a lever means having a forward portion and rearward portion pivotally affixed to said handle whereby said lever means is capable of having said forward portion in a up position when said rearward portion is in a down position;

a pull rod interconnected to said forward portion of said lever means and juxtapositioned to said hingedly affixed scoop;

wherein when said rearward portion of said lever means is moved downward said forward portion of said lever means moves upward raising said pull rod and said scoop transitions from a vertical position to a horizontal position preventing a fish from being lost while raising said fish to the surface of the ice hole.

* * * * *